United States Patent [19]

Austin et al.

[11] Patent Number: 4,482,763

[45] Date of Patent: Nov. 13, 1984

[54] PROCESS FOR HYDROXYLATING OLEFINS IN THE PRESENCE OF AN OSMIUM CONTAINING CATALYST AND ORGANIC HALOGENATED HYDROCARBON CO-CATALYST

[75] Inventors: Richard G. Austin, Ridgewood; Robert C. Michaelson, Waldwick, both of N.J.

[73] Assignee: Exxon Research & Engineering Co., Florham Park, N.J.

[21] Appl. No.: 399,270

[22] Filed: Jul. 19, 1982

[51] Int. Cl.³ ............... C07C 29/03; C07C 35/06; C07C 35/14; C07C 35/20
[52] U.S. Cl. .................. 568/860; 549/243; 560/186; 562/587; 568/458; 568/811; 568/821; 568/833; 568/838; 568/847; 260/397.2

[58] Field of Search ............. 568/860, 838, 833, 821, 568/811, 847, 458; 549/243; 560/186; 562/587; 260/397.2

[56] References Cited

FOREIGN PATENT DOCUMENTS 145604 11/1979 Japan .
1177877 1/1970 United Kingdom ............... 568/867

OTHER PUBLICATIONS

Wagner et al., "Synthetic Organic Chemistry", 1953, pp. 88–91.

Primary Examiner—J. E. Evans
Attorney, Agent, or Firm—Robert A. Maggio

[57] ABSTRACT

A process for hydroxylating olefins with an organic hydroperoxide and water in the presence of an osmium containing catalyst (e.g. $OsO_4$) and an organic halogenated hydrocarbon co-catalyst (e.g., n-butyl iodide) is disclosed.

11 Claims, No Drawings

PROCESS FOR HYDROXYLATING OLEFINS IN THE PRESENCE OF AN OSMIUM CONTAINING CATALYST AND ORGANIC HALOGENATED HYDROCARBON CO-CATALYST

BACKGROUND OF THE INVENTION

This invention relates to the hydroxylation of olefins. In particular, it relates to a procedure for reacting an olefin, e.g., ethylene or propylene, with an organic hydroperoxide oxidant in the presence of a specific catalyst composition to produce the corresponding glycol.

It is well known from the technical literature, including patents, that olefins can be effectively oxidized with catalytic amounts of osmium oxide compounds, particularly osmium tetroxide, to their corresponding diols. It is believed that no prior art discloses the use of saturated aliphatic, saturated alicyclic or aromatic halides as promoters or co-catalysts for enhancing osmium catalyzed olefin hydroxylation reactions. However, the following patents are discussed to provide a general background of such osmium catalyzed reactions.

Japanese Patent Application No. Sho 54-145604, published Nov. 14, 1979, is directed to a process for hydroxylating olefins in the presence of OsO4, a quaternary ammonium salt co-catalyst such as tetra ethyl ammonium bromide, and a peroxide including organo peroxides and $H_2O_2$ as the oxidant. Selectivities to glycol of from about 4.5 to about 66% are disclosed. It is to be noted, however, that the critical component of the co-catalyst as implied in this patent is the quaternary ammonium cation rather than the particular identity of the anion, since the anion can be any of halogen, hydroxy, nitrate, perchlorate, sulfate, methane sulfonate, trifluoromethane sulfonate, and tetra fluoro borate ions, while the cation must always be quaternary ammonium.

U.S. Pat. No. 3,488,394 discloses the hydroxylation of olefins by reacting olefin and a hypochlorite in the presence of OsO4 while U.S. Pat. No. 3,846,478 discloses the reaction of a hypochlorite and olefin in an aqueous medium and in the presence of OsO4 catalyst to hydroxylate the olefin. Both of these procedures can employ co-solvents such as t-butyl alcohol. When this is done, it is disclosed that there is some tendency for allylic chlorination of the olefinic compound to occur, e.g., by the action of t-butyl hypochlorite formed from reaction of the t-butyl alcohol and sodium hypochlorite (NaOCL). Alternatively, part of the t-butyl hypochlorite can react with allyl alcohol to form a chlorinated ether. However, it is also disclosed that the formation of t-butyl hypochlorite is undesired and can be prevented by excluding light from the reaction mixture. Thus, both of these references fail to appreciate the promoting effect obtainable from the co-catalysts of the present invention and require the use of a hypochlorite as the oxidant. In contrast the present invention does not employ hypochlorites as the oxidant.

U.S. Pat. No. 3,335,174, is directed to the use of water hydrolyzable Group Vb, VI-b and VII metal halides and oxyhalides (e.g., $OsCl_3$) as hydroxylation and esterification catalysts in conjunction with aqueous $H_2O_2$ as an oxidant. However, the process for using this catalyst requires the presence of lower aliphatic hydrocarbon acids such as glacial, formic, acetic and propionic acid as solvents. Under these conditions the reaction times vary from ½ to 4 hours, but at the shorter reaction times it is disclosed that substantial amounts of epoxide result. The only yield disclosed is obtained in connection with tungsten hexachloride in Example 1. This yield is extremely low, i.e., 22%, and includes both half-acetate and diol. Thus, among the major disadvantages of the process described in this patent are the low selectivities to diol and the corrosiveness of metal halides in the presence of glacial acids such as acetic acid.

U.S. Pat. No. 2,414,385 discloses the use of hydrogen peroxide and a catalytically active oxide, such as osmium tetroxide, dissolved in an essentially anhydrous, non-alkaline, inert, preferably organic, solvent, to convert, by oxidation, unsaturated organic compounds to useful oxygenated products such as glycols, phenols, aldehydes, ketones, guinones and organic acids. The formation of glycols is achieved by conducting the reaction at temperatures of between several degrees below 0° C. and 21° C. Such low reaction temperatures drastically, and disadvantageously, reduce the reaction rate to commercially unacceptable levels. At temperatures greater than 21° C., the formation of aldehydes, ketones and acids is favored.

U.S. Pat. No. 2,773,101 discloses a method for recovering an osmium containing catalyst such as osmium tetroxide, by converting it to the non-volatile osmium dioxide form, distilling the hydroxylation product, reoxidizing the osmium dioxide to the volatile osmium tetroxide, and then recovering the same by distillation. Suitable oxidizing agents used to oxidize olefins, and reoxidize the osmium dioxide, include inorganic peroxides such as hydrogen peroxide, sodium peroxide, barium peroxide; organic peroxides, such as t-butyl peroxide or hydroperoxide, benzoyl peroxide; as well as other oxidizing agents such as oxygen, perchlorates, nitric acid, chlorine water and the like. As with other methods of the prior art, the above process yields undesirable by-products (see col.1 line 55) thus reducing the selectivity of the process.

British Pat. No. 1,028,940 is directed to a process for regenerating osmium tetroxide from reduced osmium tetroxide by treatment of the latter with molecular oxygen in an aqueous alkaline solution. More specifically, it is disclosed that when osmium tetroxide is used by itself as an oxidizing agent, or as a catalyst in conjunction with other oxidizing agents, to oxidize hydrocarbons the osmium tetroxide becomes reduced, and in its reduced form is less active than osmium tetroxide itself. Consequently, by conducting the oxidation reaction in the presence of an alkaline medium and supplying oxygen to the medium throughout the process, the osmium tetroxide is maintained in a high state of activity. The oxidation products disclosed include not only ethylene glycol from ethylene but also organic acids from such compounds as vicinal glycols, olefins, ketones and alcohols.

U.S. Pat. No. 4,255,596 is directed to a process for preparing ethylene glycol in a homogeneous single-phase reaction medium using ethylbenzene hydroperoxide as the oxidizing agent dissolved in ethylbenzene and osmium tetroxide as the catalyst. The pH of the reaction medium is maintained at about 14 by the presence of tetraalkyl ammonium hydroxide. A small amount of water can dissolve beneficially in the medium to reduce by-product formation and improve selectivity to the glycol.

U.S. Pat. No. 4,049,724 describes the preparation of glycols from alkenes and from unsaturated alcohols in an aqueous system using osmium tetroxide and specifying stable and water-soluble aliphatic hydroperoxides, such as t-butyl hydroperoxide, while a critical pH of 8 to 12 is maintained by a suitable combination of alkali metal buffering compounds. The preparation of propylene glycol utilizing t-butyl hydroperoxide is exemplified in the patent at a selectivity based on the hydroperoxide of 45%.

See also: U.S. Pat. No. 3,317,592 (discloses production of acids and glycols using oxygen as oxidant, $OsO_4$ as catalyst at pH 8 to 10); U.S. Pat. No. 3,928,473 (discloses hydroxylation of olefins to glycols with $O_2$ oxidant, octavalent osmium catalyst (e.g. $OsO_4$) and borates as promoter); U.S. Pat. No. 3,931,342 (discloses a process for recovering glycols from an aqueous solution containing alkali metal borate and osmium compounds (e.g. $OsO_4$)); U.S. Pat. No. 3,953,305 (discloses use of $OsO_4$ catalyst for hydroxylating olefins which is regenerated by oxidizing hexavalent osmium with hexavalent chromium and electro-chemically regenerating hexavalent chromium); U.S. Pat. No. 4,203,926 (discloses ethylbenzene hydroperoxide as oxidant used in a two-phase system to hydroxylate olefins in presence of $OsO_4$ and cesium, rubidium and potassium hydroxides); U.S. Pat. No. 4,217,291 (discloses the oxidation of osmium (III) or (IV) in an ionic complex with oxygen and an alkali metal, ammonium, or tetra (-lower) alkyl ammonium cation to a valency of greater than $+5+$organohydroperoxides); U.S. Pat. No. 4,229,601 (discloses the use of cesium, rubidium and potassium hydroxides as promoters for $OsO_4$ catalyst and t-butyl hydroperoxide oxidant for hydroxylating olefins); and U.S. Pat. No. 4,280,924 (discloses a process for regenerating perosmate catalyst, e.g., cesium, rubidium and potassium perosmate).

From the above discussion, it can be concluded that osmium catalyzed hydroxylation systems of the prior art generally employ very careful pH control and/or promoters or catalysts which usually constitute salts typically associated with exotic and expensive cationic components, e.g., cesium, tetra alkyl ammonium and the like.

There has, therefore, been a continuing search for ways to improve the efficiency and/or economics of osmium catalyzed hydroxylation reactions. The present invention is a result of this search.

In U.S. Pat. No. 4,314,088 the inventors herein describe, inter-alia, a process for hydroxylating olefins using a catalyst composition comprising $OsO_4$ and a co-catalyst such as alkali or alkaline earth metal halides. While this process represents an improvement over the prior art, some of the halogen values can be lost upon recovery of the reaction products. This loss may occur by reaction of some of the alcohol product with the halide to form alkyl halides which are vaporized upon distillation of reaction products. Thus, absent a recognition that the resulting alkyl halides have any promoting effect they would not be considered process credits, likely would be discarded, and the economics of the process would be reduced. Accordingly, in one embodiment, the process of the present invention represents an improvement over the above identified patent in that any alkyl halides which form in-situ have now been found to be promoters in their own right and can, therefore, be recycled back to the reaction mixture thereby avoiding loss of process credits or the promoting effect contributed by the halogen of the alkyl halides so recycled.

SUMMARY OF THE INVENTION

In one aspect of the present invention there is provided a process for hydroxylating olefins which comprises reacting at least one olefinic compound having at least one ethylenic unsaturation with water and at least one organic hydroperoxide oxidant in the presence of a catalyst composition under conditions and in a manner sufficient to convert at least one of said ethylenic unsaturation to its corresponding diol, said catalyst composition comprising:

(a) at least one osmium containing compound capable of catalyzing said reaction; and (b) as a co-catalyst at least one halogenated organic hydrocarbon compound having an identity and in amounts effective to improve at least one of the rate and selectivity of said reaction relative to the rate and selectivity in the absence of said co-catalyst.

DESCRIPTION OF PREFERRED EMBODIMENTS

In accordance with the present invention, at least one olefin having at least one ethylenic unsaturation is reacted with at least one organic hydroperoxide and water in the presence of at least one osmium containing compound, and at least one co-catalyst I, and optionally at least one co-catalyst II in a manner and under conditions sufficient to hydroxylate at least one of said ethylenically unsaturated groups to its corresponding diol group.

The identity of the osmium containing catalyst is not critical to the present invention and can be any osmium containing substance capable of catalyzing the hydroxylation reaction. Thus, for example the most conventional osmium containing catalyst is osmium tetroxide ($OsO_4$) wherein osmium is in the $+8$ valence. Other osmium oxides having an osmium valence state of less than $+8$ can also be employed, they being oxidized in-situ back to the osmium ($+8$). Similar considerations apply to ionic osmium oxide compounds such as those described in U.S. Pat. No. 4,217,291 the disclosure of which is herein incorporated by reference. These ionic osmium compounds can be represented by the formula:

$$M'_xOsO_y \qquad (I)$$

wherein $M'$ is a cation of an alkali or alkaline earth metal, ammonium, or tetraalkyl ammonium, preferably tetraalkyl ammonium in which the alkyl group has from about 1 to about 5 carbons, and x and y are numbers such that 2y-x is the valence of the osmium in any compound defined by this formula. While the preferred ionic osmium compounds of this class are the perosmates ($M'_2OsO_5$) other ionic osmium compounds such as $M'_2OsO_4$ (known as osmates), $M'_2OsO_3$, and $M'OsO_2$ can also be employed, they being converted to the perosmates in the presence of the organic hydroperoxides.

A preferred class of osmium compounds include the osmium halides and oxyhalides as disclosed in U.S. patent application Ser. No. 310,217, filed Oct. 9, 1981, of common inventorship herein, and commonly assigned, the disclosure of which is herein incorporated by reference. Such osmium halide containing catalysts include those represented by the structural formulae: $Os(X)_n$ (e.g., $OsX_3$, $OsX_4$, and $OsX_5$); $Os(OH)X_3$; $OsoX_4$; $OsOX_5$; $OsO_3X_2$; $OsONX_4$; $(M)_{n'}[OsX_6]^{-2}$; $(M)_{n'}[OsO_2X_4]^{-2}$; $M^{+1}[Os(OH)X_5]^{-1}$;

$(M)_{n'}[OsO_4X_2]^{-2}$; $(M)_{n'}[OsO_2(OH)X_2]^{-2}$; $(M)_{n'}[OsNX_5]^{-2}$; and mixtures thereof; wherein X is halogen independently selected from the group consisting of F, Cl, Br and I; n is an integer which can vary from 3 to 5, M is a cation including cations of alkali metals (e.g., Li, Na, K, Rb, Cs, Fr), alkaline earth metals (e.g., Be, Mg, Ca, Sr, Ba, Ra), ammonium (i.e. $NH_4+$), tetra hydrocarbyl ammonium (e.g. $(R)_4N^+$) and tetra hydrocarbyl phosphonium (e.g. $(R)_4P^+$), and $n'$ is a number which is selected in conjunction with the valence of cation M to achieve a neutral complex; preferably $n'$ is 1. The tetra hydrocarbyl ammonium or phosphonium respective cations constituting M can be represented by the respective structural formula $(R)_4N^+$ and $(R)_4P^+$ wherein R is a hydrocarbyl group independently selected from the group consisting of substituted and unsubstituted: alkyl, typically alkyl having from about 1 to about 30 carbons, preferably from about 1 to about 20 carbons, and most preferably from about 1 to about 10 (e.g. 1–5) carbons, aryl, preferably aryl having from 6 to about 14 carbons, and most preferably from 6 to about 10 carbons, and alkaryl and aralkyl wherein the aryl and alkyl groups thereof are as described immediately above; said R substituents including hydroxyl; halide (i.e., F, Cl, Br, and I); ether groups represented by the structural formulae $-O-R_2$ and $-R_3-O-R_2$ wherein $R_2$ and $R_3$ are independently selected from the group consisting of alkyl, typically about $C_1$ to about $C_{10}$ alkyl, preferably about $C_1$ to about $C_5$ alkyl, and most preferably about $C_1$ to about $C_3$ alkyl; and ester groups represented by the structural formulae:

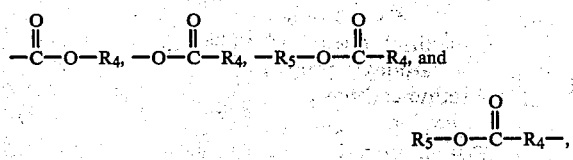

wherein $R_4$ and $R_5$ which may be the same or different are as defined in connection with $R_2$ and $R_3$; and mixtures thereof.

Representative examples of such compounds include $OsF_3$, $OsCl_3$, $OsBr_3$, $OsI_3$, $OsF_4$, $OsCl_4$, $OsBr_4$, $OsI_4$, $OsF_5$, $Os(OH)Cl_3$, $Os(OH)F_3$, $OsOF_4$, $OsOCl_4$, $OsO_3F_2$, $OsONCl_4$, $K_2[OsCl_2Br_2I_2]$, $(NH_4)_2[OsF_6]$, $Ca[OsI_6]$, $Li_2[OsO_2Cl_4]$, $(CH_3CH_2)_4N[Os(OH)Cl_5]$, $(CH_3CH_2)_4P[Os(OH)Br_5]$, $Mg[OsO_4F_2]$, $Na_2[Os(OH)_2Cl_2]$, $Ba[OsCl_5N]$, $K_2[OsNCl_5]$, $K_2[OsNBr_5]$, and mixtures thereof. Compounds of the formula $OsX_3$ (e.g. $OsCl_3$) are the most preferred of this class.

A further preferred class of osmium containing catalysts are the supported osmium compounds such as osmium carbonyls, as described in U.S. Pat. No. 4,413,151 of Michaelson, Austin and White, the disclosure of which is herein incorporated by reference.

Other suitable osmium containing catalysts include osmium carbonyls, e.g., $Os_3(CO)_{12}$ in unsupported form, which are described in U.S. patent application Ser. No. 420,137, filed Sept. 20, 1982 of Michaelson, Austin and White.

The osmium containing compounds are employed in amounts effective to catalyze the hydroxylation reaction. Thus while any effective amount of osmium catalyst will suffice, it is preferred that such effective amounts constitute typically from about $1 \times 10^{-1}$ to about $1 \times 10^{-8}$ moles, preferably from about $1 \times 10^{-2}$ to about $1 \times 10^{-6}$ moles, and most preferably from about $1 \times 10^{-2}$ to about $1 \times 10^{-4}$ moles, of osmium in the osmium catalyst per mole of olefin ethylenic unsaturation to be hydroxylated.

Alternatively, such amounts may be expressed as varying from about 1 to about 10,000, preferably from about 50 to about 1,000, and most preferably from about 200 to about 800 ppm, based on the total weight of liquid reaction medium including the weight of olefin and any other additives (e.g., buffers) solvent, or co-catalyst.

Co-catalyst I (also referred to herein as the first co-catalyst) which is employed in conjunction with the above described osmium catalyst, comprises at least one organic halogenated hydrocarbon compound having an identity effective to improve the rate and/or selectivity of the hydroxylation reaction relative to the rate and/or selectivity in the absence of co-catalyst I. The hydrocarbyl portion of the co-catalyst I is believed to function as a carrier for the halogen moiety, the latter being believed to be responsible for the promoting effect of the co-catalyst I. Consequently, except for steric considerations, the identity of the hydrocarbyl portion of the co-catalyst is not critical provided it is inert under reaction conditions, and does not adversely affect the interaction of the halide present thereon with the osmium in the osmium catalyst. The term "inert" as applied to co-catalyst I is defined herein to mean that it does not enter into the hydroxylation reaction to produce by-products.

Accordingly, the co-catalyst includes any halogenated hydrocarbon compound, wherein the hydrocarbyl portion is selected from saturated aliphatic, saturated alicyclic, and aromatic.

More specifically, suitable co-catalysts I can be represented by the structural formula:

$$R_1-(X)_{n''} \qquad (II)$$

wherein $R_1$ can be inertly substituted or unsubstituted: alkyl, typically alkyl of from about 1 to about 20, preferably from about 1 to about 10, most preferably from about 1 to about 5 carbons, aryl, typically aryl of from about 6 to about 14, preferably 6 to about 10, most preferably 6 carbons, aralkyl and alkaryl wherein the alkyl and aryl groups thereof are as defined immediately above, cycloalkyl, typically cycloalkyl of from about 4 to about 20, preferably from about 5 to about 15, and most preferably from about 5 to about 10 carbon atoms; X is at least one halogen independently selected from the group consisting of F, Cl, Br and I, and preferably I and Br; $n''$ is a number of from about 1 to about 10, preferably from about 1 to about 8 (e.g., 2 to 6), and most preferably from about 1 to about 6 (e.g., 2 to 4); and said $R_1$ substituents include hydroxy, ester and ether groups as described above in connection with the R substituents of the tetra hydrocarbyl ammonium cation M of the osmium halides and oxy halides. The term "inertly substituted" is defined herein to mean any organic or inorganic substituent which is stable under reaction conditions and does not adversely affect the performance of said co-catalyst, relative to the unsubstituted halogenated organic compound.

Representative examples of suitable co-catalysts I include iodomethane, bromomethane, 1-iodoethane, 1-bromoethane, 1,2-dibromoethane, 1-chloroethane, 1,2-dichloroethane, 1-iodopropane, 1-bromopropane, 1-chloropropane, 2-iodo-1-methylethane, 2-bromo-1-methylethane, 2-chloro-1-methylethane, 1-iodobutane, 2-iodobutane, 2-bromobutane, 1-chlorobutane, 2-methyl-2-iodopropane, 2-methyl-2-bromopropane, 1-iodo-1-methylpropane, 1-bromo-1-methylpropane, 1-chloro-1-methylpropane, 1-iodo-1,1-dimethylethane, 1-chloro-1,1-dimethylethane, 1-chloro-1,1-dimethylethane, benzyl iodide, phenyliodomethane, phenylchloromethane, phenylbromomethane, 1,2-dichlorobenzene, 2-bromoethanol, 2-chloroethanol, 2-iodoethanol, 1-phenyl-2-iodoethane, 1-phenyl-4,4-dichlorobutane, 1-(1,2-dichloroethyl)benzene, 1-(1-chloropropyl) naphthylene and mixtures thereof.

Preferred co-catalysts I include iodomethane, bromomethane, 1-bromobutane, 1-iodobutane, 1-bromo-1,1-dimethylethane, 1-iodo-1,1-dimethylethane, 2-iodobutane, 2-bromobutane, 2-methyl-2-iodopropane, 2-methyl-2-bromopropane, 2-bromoethanol, 2-iodoethanol, 2-chloroethanol, and mixtures thereof.

The most preferred co-catalysts I contain iodine and include 1-iodobutane, iodomethane, 2-iodobutane, 2-iodoethanol, 2-methyl-2-iodopropane, and mixtures thereof. In addition to the degree of the promoting effect of co-catalyst I, another factor which will influence the identity of the particular co-catalyst I selected, is its volatility. Preferably co-catalyst I is selected so that the difference in boiling points between the same and the hydroxylated product is sufficient to permit easy separation thereof by distillation techniques. Optimally, from a process standpoint, the co-catalyst I will boil at a temperature substantially above the hydroxylated product so that it will not be vaporized along with the product upon distillation, although this may not be practical from an economic standpoint.

The co-catalyst I is employed in amounts effective to increase the rate and/or selectivity of the hydroxylation reaction relative to the rate and/or selectivity of hydroxylation in their absence.

Accordingly, while any effective amount of co-catalyst I can be employed, it is contemplated that such effective amounts constitute typically from about 1 to about 10,000 mole percent, preferably from about 50 to about 1,000 mole percent, and most preferably from about 200 to about 500 mole percent, co-catalyst I based on the total number of moles of osmium in the osmium catalyst employed. Alternatively, the amount of co-catalyst I can be expressed as the molar ratio between the moles of halide species on co-catalyst I and the moles of osmium metal in the osmium catalyst. Accordingly, such molar ratios typically will vary from about 0.1:1 to about 500:1, preferably from about 1:1 to about 50:1, and most preferably from about 2:1 to about 10:1.

Co-catalyst II which is optionally employed in conjunction with co-catalyst I serves a similar function as co-catalyst I and generally comprise salts. The description and use of most of these co-catalyst II salts is provided in U.S. Pat. No. 4,314,088 and a continuation-in-part thereof, namely, U.S. patent application Ser. No. 310,099, filed Oct. 9, 1981 the disclosures of which are herein incorporated by reference. More specifically, co-catalyst II is selected from the group consisting of alkali metal (e.g. Li, Na, K, Rb, Cs, and Fr) and alkaline earth metal (e.g., Be, Mg, Ca, Sr, Ba, Ra) halides, hydrogen halides, tetra hydrocarbyl ammonium or phosphonium halides, halogens, transition metal halides and mixtures of any of the above classes of co-catalysts II as well as mixtures of any co-catalysts II within each class.

Representative examples of alkali and alkaline earth metal halide co-catalysts II (referred to herein as Group 1 co-catalyst II) include lithium bromide, sodium bromide, potassium chloride, sodium iodide, potassium iodide, cesium chloride, magnesium chloride, calcium bromide, and barium fluoride and mixtures thereof.

The preferred Group I co-catalyst II includes sodium iodide, potassium iodide, sodium bromide and mixtures thereof.

Representative examples of suitable hydrogen halides (referred to herein as Group 2 co-catalyst II) include hydrogen: iodide, chloride, fluoride, and bromide and mixtures thereof, preferably hydrogen iodide, and hydrogen bromide.

Representative examples of suitable tetra hydrocarbyl ammonium or phosphonium halides (referred to herein as Group 3 co-catalyst II) include those represented by the structural formulae:

$$(R)_4P^+X^- \qquad (III)$$

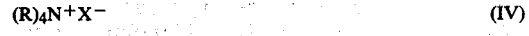

$$(R)_4N^+X^- \qquad (IV)$$

wherein R is a hydrocarbyl group as defined above in connection with the description of M; and X is halide, i.e., F, Cl, Br and I. Preferably R is tetra lower ($C_1$ to $C_5$) alkyl or tetra ($C_6$) aryl.

Representative examples of Group 3 co-catalyst II include tetramethyl phosphonium bromide, tetrapropyl phosphonium fluoride, tetraethyl phosphonium chloride, tetradecyl phosphonium iodide, tetraphenyl phosphonium chloride, dimethyl diethyl phosphonium bromide, methytriethyl phosphonium chloride, tetrabutyl phosphonium iodide, phenyltrimethyl phosphonium chloride, diphenyl diethyl phosphonium bromide, tetra 2-(methoxy) ethyl phosphonium chloride, tetra 4-(propoxy methyl) phenyl phosphonium bromide, di 3-(methoxy carbonyl) propyldiethyl phosphonium iodide, di 4-(ethyl carbonyloxy) butyl-dimethyl phosphonium chloride, tetra 5-(ethoxy carbonyl methyl) pentyl phosphonium bromide, tetra 4-hydroxy butyl phosphonium chloride, tetra 3-chloro propyl phosphonium bromide, tetra methyl ammonium bromide, tetra ethyl ammonium chloride, tetra decyl ammonium bromide, tetra phenyl ammonium chloride, tetra phenyl ammonium bromide, dimethyl diethyl ammonium iodide, methyl triethyl ammonium chloride, tetra butyl ammonium chloride, phenyl trimethyl ammonium bromide, phenyl trimethyl ammonium chloride, phenyl triethyl ammonium iodide, tetra-(4-methyl phenyl) ammonium chloride, tetra-(3-phenyl-1-propyl) phosphonium bromide, and mixtures thereof.

Preferred examples of Group 3 co-catalyst II include: tetra alkyl and tetra aryl ammonium or phosphonium halides such as tetra ethyl phosphonium chloride, bromide and iodide.

Representative examples of halogen co-catalyst II (referred to herein as Group 4 co-catalyst II) include $F_2$, $Cl_2$, $Br_2$, and $I_2$, preferably $I_2$.

Transition metal halides (referred to herein as Group 5 co-catalyst II) typically are salts having a cation of a transition metal and a halide anion.

Representative examples of such transition metals include those with a variable oxidation state such as Fe, Co, Ni, Cu, V, Cr, Mn, Sc, Ti, Mo, Ru, Rh, Pd, and W.

The preferred transition metals include Cu, Fe, Ni, Co, and Mn.

Representative examples of Group 5 co-catalysts II include $FeF_3$, $FeCl_3$, $FeBr_3$, $FeF_2$, $FeCl_2$, $FeBr_2$, $FeI_2$, $CoCl_2$, $CoF_3$, $CoF_2$, $NiF_2$, $NiBr_2$, $NiI_2$, $NiCl_2$, $CuF_2$, $CuBr_2$, $CuI_2$, $CuF_2$, $CuI$, $CuCl$, $CuBr$, $VF_5$, $VF_4$, $VF_3$, $VF_2$, $VCl_4$, $VCl_3$, $VBr_4$, $VBr_3$, $VI_3$, $CrF_2$, $CrF_3$, $CrF_4$, $CrF_5$, $CrF_6$, $CrCl_3$, $CrCl_4$, $CrBr_3$, $CrBr_4$, $CrI_3$, $MnCl_2$, $MnCl_3$, $MnCl_4$, $MnBr_3$, $MnI_3$, $ScCl_3$, $ScFl_3$, $TiCl_4$, $TiBr_4$, $TiFl_4$, $MoCl_3$, $Mo_2Cl_{10}$, $MoBr_4$, $Mo_2F_9$, $MoF_6$, $MoF_5$, $RuF_5$, $RuF_3$, $RuF_4$, $RuF_6$, $RuCl_3$, $RuCl_4$, $RuCl_6$, $RuBr_6$, $RhF_3$, $RhF_4$, $RhF_6$, $PdF_2$, $PdCl_2$, $PdBr_2$, $PdI_2$, $WCl_6$, $WBr_5$, $WCl_3$, $WBr_3$, and $WI_3$.

Preferred Group 5 co-catalyst II includes $WCl_6$.

It is recommended for best results that the most preferred valence of the transition metals of Group 5 co-catalyst II as initially employed be that which represents the highest stable oxidation state thereof. While this is not critical, it avoids the need in some instances to oxidize the transition metal in-situ so that it can be reduced.

Co-catalyst II is employed in amounts effective to increase the rate and/or selectivity of the hydroxylation reaction. Thus, while any effective amount of co-catalyst II can be employed, such effective amounts typically will vary from about 5 to about 100,000 ppm, preferably from about 50 to about 10,000 ppm, and most preferably from about 100 to about 1000 ppm, by weight based on the total weight of the liquid contents of the reaction vessel.

Alternatively, the amount of co-catalyst II can be expressed as a molar ratio between the molar amount of halide species in co-catalyst II and the molar amount of osmium metal in the osmium catalyst. Accordingly, such molar ratios typically will vary from about 2:1 to about 100:1, preferably from about 2:1 to about 50:1, and most preferably from about 2:1 to about 25:1.

Since many of the co-catalyst II salts are cheaper than co-catalyst I, a preferred embodiment of the present invention is to employ a mixture of co-catalysts I and II. During the course of the reaction, the halogen moiety of co-catalyst II can react with the hydroxylated product thereby forming a co-catalyst I. This tends to limit or prevent loss of the halogen moiety by converting it to different but active form which is easily recovered and recycled.

Accordingly, where a mixture of co-catalysts I and II is employed, the total amount of each co-catalyst will be sufficient to achieve a molar ratio between the moles of halide species in the mixture of co-catalysts and the moles of osmium in the osmium catalyst of typically from about 0.1:1 to about 500:1, preferably from about 1:1 to about 50:1, and most preferably from about 2:1 to about 10:1.

The oxidant for the hydroxylation reaction is at least one organic hydroperoxide. Conventional organohydroperoxides include those having the formula:

ROOH        (V)

wherein R is a substituted or unsubstituted: alkyl, typically about $C_3$ to about $C_{20}$, preferably about $C_3$ to about $C_{10}$, most preferably about $C_3$ to about $C_6$ alkyl; aryl, typically $C_6$ to $C_{14}$, preferably $C_6$ to $C_{10}$, most preferably $C_6$ aryl; aralkyl and alkaryl wherein the aryl and alkyl groups thereof are as defined immediately above; cycloalkyl, typically about $C_4$ to about $C_{20}$, preferably about $C_4$ to about $C_{10}$, most preferably about $C_4$ to about $C_8$ cycloalkyl; as well as oxacyclic having 1 to about 5 oxygens and preferably 3 to about 20 carbons, and azacyclic having 1 to about 5 nitrogens and preferably about 3 to about 20 carbons; and wherein the substituents of said R group include halogen, hydroxyl, ester and ether groups.

Representative examples of suitable organohydroperoxides include ethylbenzyl hydroperoxide, t-butyl hydroperoxide, t-amyl hydroperoxide, cumene hydroperoxide, 2-methyl-2-hydroperoxy-methyl proprionate, 2-methyl-2-hydroperoxy propanoic acid, pyrrolehydroperoxide, furan hydroperoxide, 2-butylhydroperoxide, cyclohexyl hydroperoxide, and 1-phenylethylhydroperoxide.

The most preferred organic hydroperoxides include t-butyl hydroperoxide, ethylbenzylhydroperoxide, and t-amyl hydroperoxide. Frequently these hydroperoxides are made by the molecular oxygen oxidation of the corresponding hydrocarbon which also produces an alcohol as a by-product. For example, when isobutane is oxidized with molecular oxygen there is produced tertiary butyl hydroperoxide and tertiary butyl alcohol. It is not necessary to separate the alcohol from the hydroperoxide since the alcohol can function as a diluent or solvent.

The amount of organohydroperoxide employed is not critical and can vary widely. Generally, the organohydroperoxide is employed in less than stoichiometric requirements (i.e., less than 1:1 molar ratio of organohydroperoxide per mole of ethylenic unsaturation in the olefin to be hydroxylated. Thus, while any amount of hydroperoxide effective to hydroxylate the olefin can be employed, it is contemplated that such effective amounts constitute a ratio of moles of ethylenic unsaturation in the olefin to moles or organohydroperoxide of typically from about 0.5:1 to about 100:1, preferably from about 1:1 to about 20:1 and most preferably from about 2:1 to about 10:1.

While the organohydroperoxide can be added to the reaction mixture in anhydrous form, it is preferred to add the organohydroperoxide as an aqueous solution comprising from about 1 to about 99%, preferably from about 10 to about 90%, and most preferably from about 20 to about 70%, by weight hydroperoxide, based on the weight of the aqueous hydroperoxide solution.

It is also critical to have water present during the hydroxylation reaction since the water is believed to contribute one of the oxygen molecules constituting one of the hydroxyl groups in the resulting glycol. The source of this water is not critical. Water is, therefore, added separately, preferably as the solvent for the organohydroperoxide. Accordingly, water is provided to, and/or is present, in the initial reaction mixture in at least a stoichiometric molar ratio with the molar amount of ethylenic unsaturation of the olefin to be hydroxylated. Such ratios preferably also are present in the reaction mixture at any given time after start-up. Accordingly, water is present in the reaction mixture at molar ratios of water to olefin ethylenic unsaturation to be hydroxylated in the reaction mixture of from about 1:1 to about 100:1, preferably from about 1:1 to about 50:1, and most preferably from about 1:1 to about 20:1. Such molar ratios typically can be achieved by controlling the amount of water in the reaction mixture to be from about 1 to about 90%, preferably from 15 to about 85%, and most preferably from about 20 to about 60%, by weight, based on the total weight of the reaction mixture. Preferably the amount of water employed is less than that which will cause separation of the reaction mixture into an aqueous phase and organic phase although this is not a critical condition.

Olefins which can be hydroxylated in accordance with the present invention contain at least one ethylenic unsaturation and comprise any of the unsaturated aliphatic or alicyclic compounds well known in the art for undergoing such hydroxylation reactions. Typically, such compounds will contain from about 2 to about 20 carbons, preferably from about 2 to about 10 carbons, and most preferably from about 2 to about 5 carbons. Such compounds may be straight or branched chain, mono-olefinic, di-olefinic, or poly-olefinic, conjugated or non-conjugated. They may be substituted with such groups as aryl, preferably aryl of from 6 to about 14 carbons, alkyl, preferably alkyl of from 1 to 10 carbons, or aralkyl and alkaryl wherein the alkyl and aryl portions thereof are as described above, as well as with functional groups such as hydroxyl, carboxyl and anhydride.

Typical of such olefins are those represented by the structural formula:

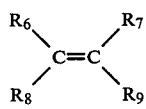

wherein $R_6$, $R_7$, $R_8$, and $R_9$, which may be the same or different, are selected from the group consisting of hydrogen; substituted or unsubstituted: alkyl, aryl, alkaryl, and aralkyl hydrocarbyl groups, said hydrocarbyl groups being preferably as defined immediately above; or any two or said $R_{7-9}$ groups together can constitute a cycloalkyl group typically of from about 4 to about 12, preferably from about 5 to about 8 carbons.

Representative olefins which can be hydroxylated and contain at least one ethylenic unsaturation include: ethylene, propylene, butene-1, butene-2, isobutene, pentene-1, pentene-2, butadiene, hexene, isohexene, heptene, 3-methylhexene, octene-1, isooctene, nonene, decene, dodecene, tridecane, pentadecene, octadecene, eicosene, docosene, tricosene, tetracosene, pentacosene, butadiene, pentadiene, hexadiene, octadiene, decadiene, tridecadiene, eicosadiene, tetracosadiene, cyclopentene, cyclohexene, cycloheptene, methylcyclohexene, isopropylcyclohexene, butylcyclohexene, octylcyclohexene, dodecylohexene, acrolein, acrylic acid, 1,2,3,b-tetrahydrophthalic anhydride, methyl methacrylate, styrene, cholestrol, and mixtures thereof.

The preferred olefins are ethylene, propylene, isobutylene, butadiene, styrene, allyl alcohol and allyl chloride.

The most preferred olefin is ethylene and/or propylene.

The preferred mode for conducting the hydroxylation reaction is in the liquid phase in a liquid reaction mixture, preferably provided as a homogeneous or substantially homogeneous medium and preferably but optionally by using an inert organic solvent to dissolve or assist in dissolving the osmium catalyst if employed in unsupported form, co-catalysts and reactants.

Partial immiscibility of the solvent with water is acceptable although not preferred. By an inert solvent is meant one which does not undergo oxidation during the course of the reaction.

Suitable inert organic solvents preferably possess polar functional groups and include aliphatic or aromatic alcohols having from 1 to about 10 carbon atoms, preferably tertiary alcohols, aliphatic or aromatic ketones having from 3 to about 10 carbon atoms, aliphatic or alicyclic ethers having from 2 to about 10 carbon atoms, glycols having from about 2 to about 10 carbon atoms, N,N-dialkyl amides having from 3 to about 10 carbon atoms, nitriles having from about 2 to about 10 carbons, aliphatic or aromatic sulfoxides having from 2 to about 14 carbon atoms, aliphatic or aromatic sulfones having from 2 to about 14 carbon atoms, and the like. Examples of suitable solvents include methanol, ethanol, propanol, butanol, hexanol, decanol, t-butyl alcohol, t-amyl alcohol, benzyl alcohol, acetone, methylethyl ketone, methylbutyl ketone, acetophenone, ethylene glycol, propylene glycol, diethylene glycol, tetraethylene glycol, dimethyl formamide, diethyl formamide, dimethyl acetamide, dimethyl sulfoxide, diethyl sulfoxide, di-n-butyl sulfoxide, diphenyl sulfoxide, dibenzyl sulfoxide, dimethyl sulfone, diethyl sulfone, tetramethylene sulfone, diphenyl sulfone, acetonitrile, pyridine, dioxane, tetrahydrofuran tetrahydropyran, dioxolane, and mixtures thereof.

The preferred solvents include those which are substantially or completely miscible with water such as t-butyl alcohol, methanol and acetonitrile.

The most preferred solvent(s) is the hydroxylated olefin which possesses at least one glycol functionality or mixtures of the product glycol and the product alcohol derived from the organohydroperoxide.

For example, when ethylene is hydroxylated using t-butyl hydroperoxide, the preferred solvent is ethylene glycol or a mixture of ethylene glycol and t-butyl alcohol, the latter being formed in-situ from t-butyl hydroperoxide. The former (product glycol) avoids solvent separation process steps and the latter is economical since the ethylene glycol and t-butyl alcohol are both saleable products which have to be separated anyway. In either instance, an additional solvent separation step is avoided. The co-catalyst I can also be employed in excessive amounts to function as the solvent although this is not an economical embodiment.

The inert solvent is preferably employed in amounts sufficient to achieve a homogeneous solution with respect to at least the olefin, co-catalyst and oxidant. Typically, such amounts can vary from about 0 to about 90%, preferably from about 20 to about 80%, and most preferably from about 20 to about 50%, by weight, based on the total weight of the reaction mixture.

The pH of the reaction mixture during the hydroxylation reaction need not be rigidly controlled although for optimum results it typically will not be allowed to drop below about 4, preferably not below about 6. Likewise, the pH of the reaction mixture typically will not be allowed to exceed about 12 although the process can still be conducted at a pH below 4 and above 12. Accordingly, the pH of the reaction mixture typically will be maintained between about 4 and 12, preferably between about 6 and about 12, and most preferably between about 7 and about 12. The pH of the reaction mixture can be controlled by the use of conventional buffers or base where needed.

For example, when using $OsCl_3$ as a catalyst one mole of HCl may form per mole of catalyst employed under reaction conditions. To compensate for this effect, suitable phosphate, acetate, carbonate, and pyridine buffers can be employed as well as hydroxides.

When employing an unsupported osmium catalyst, the process of the present invention is conducted by bringing into contact, e.g., by admixing, olefin, water, oxidant, osmium catalyst, co-catalyst, and optional inert solvent to form a liquid reaction mixture in a manner and under conditions sufficient to hydroxylate the olefin, i.e., to convert at least one of the ethylenic unsaturations possessed thereby to its corresponding diol. The manner and order of addition of each of the individual components of the liquid reaction mixture to the reaction vessel is not critical. However, it is preferred to mix the unsupported osmium catalyst, and co-catalyst with an aqueous solution of the hydroperoxide and then add solvent, additional additives such as buffers, where needed, and finally olefin.

Accordingly, the initial reaction mixture prior to introduction of olefin will typically comprise: (a) an organohydroperoxide in an amount of from about 1 to 70%, preferably from about 5 to about 60%, and most preferably from about 10 to about 50%, by weight, based on the weight of the reaction mixture exclusive of the weight of olefin, catalyst, co-catalyst and any other additives if present; (b) osmium catalyst in amounts heretofore specified; (c) co-catalyst(s) in amounts heretofore specified; (d) water subject to the molar constraints heretofore specified in an amount of from about 1 to about 98%, preferably from about 10 to about 80%, and most preferably from about 30 to about 60%, by weight, based on the total weight of the reaction mixture exclusive of the weight of olefin, catalyst, co-catalyst(s), and any other additives if present; and (e) inert organic solvent in an amount of from about 0 to about 99%, preferably from about 20 to about 80%, and most preferably from about 30 to about 60%, by weight, based on the weight of the reaction mixture exclusive of the weight of olefin, catalyst, co-catalyst(s) and other additives if present.

When a supported osmium catalyst is employed, the hydroxylation reaction is also preferably conducted in the liquid phase with the exception that the osmium supported catalyst will be suspended as a slurry in the reaction mixture or as a fixed bed through which the reaction mixture is passed. Further details of this embodiment are provided in U.S. Pat. No. 4,413,151.

For the production of ethylene glycol, propylene glycol or any product derived from any unsaturated gaseous olefin, the latter may be bubbled through the reaction mixture containing the components described herein or it may be introduced under pressure. However, it is preferred that the reaction takes place in the liquid phase. Consequently, sufficient pressure is preferably employed to maintain the gaseous reactants in the liquid phase. Otherwise, the reaction pressure is not critical and can be atmospheric, sub-atmospheric, or super-atmospheric.

When the olefin reactant is a liquid or is dissolved in the reaction mixture under pressure, its concentration in the reaction mixture typically will vary from about 1 to about 98%, preferably from about 10 to about 80%, and most preferably from about 15 to about 60%, by weight, based on the total weight of the reaction mixture inclusive of the weight of components (a) through (e) described above.

The hydroxylation reaction is typically conducted at temperatures which can vary over wide limits although it is preferred to maintain the reaction mixture in the liquid phase. Accordingly, typical reaction temperatures can vary from about 0° to about 250° C., preferably from about 20 to about 150° C., and most preferably from about 30 to about 130° C.

At temperatures greater than the aforenoted ranges, the reaction rate may increase substantially but this usually occurs at the expense of a significant reduction in selectivity. At very low reaction temperatures, e.g., below about 0° C. the reaction rate decreases to a commercially undesirable degree. Accordingly, while the reaction temperature is not critical and can vary over a wide range, one normally would not operate at temperature extremes outside the aforenoted ranges.

The hydroxylation reaction can be performed as a batch reaction, as a continuous reaction or as a semi-continuous reaction.

In the batch reaction, a reaction medium containing the above described components is charged into the reaction vessel along with olefin if in liquid form. Alternatively, the reaction vessel is then pressurized with olefin if in gaseous form. It may be desirable to heat the liquid reaction mixture to reaction temperature prior to pressurizing with the reactant gases. The reaction is allowed to proceed to completion, typically for a period of from about 0.5 to about 5 hours, preferably from about 0.5 to about 3 hours, and most preferably from about 0.5 to about 2 hours.

In the continuous process, the reaction mixture components can be introduced into the inlet of an elongated reactor at a rate such that substantially complete reaction will have taken place by the time the reaction mixture reaches the reactor outlet. The reaction can be carried out in a semi-continuous manner by metering the reaction mixture components into a series of two or more tank reactors at the appropriate rate to maintain the reactor liquid level.

Additionally, the process may be run in either of the aforementioned modes by altering the reaction conditions, and/or, the reactant, solvent, catalyst, co-catalyst, and pH control additive concentrations during the course of the reaction. Thus, the process may be run by changing the temperature, pressure, catalyst concentration, oxidant concentration, and/or olefin concentration.

The spent reaction mixture after removal of unreacted olefin is a solution or slurry of product glycol, by-products if any, solvent, water, catalyst and co-catalyst(s). The volatile components are distilled out of the reaction mixture into various fractions leaving non-volatile catalyst and co-catalyst components in the still. The product glycol is then separated from the high boiling distillate which can also include co-catalyst I. Catalyst, and/or any co-catalyst components, particularly co-catalyst I, are recovered and recycled to the reaction mixture for reuse.

The following examples are given as specific illustrations of the claimed invention. It should be understood, however, that the invention is not limited to the specific details set forth in the examples. All parts and percentages in the examples as well as in the remainder of the specification are by weight unless otherwise specified.

Unless otherwise specified, in the following examples selectivity, conversion and yield are calculated as follows:

$$\% \text{ selectivity} = \frac{\text{moles of glycol formed}}{\text{moles of hydroperoxide reacted}} \times 100$$

$$\% \text{ conversion} = \frac{\text{moles of hydroperoxide reacted}}{\text{moles of hydroperoxide charged}} \times 100$$

$$\% \text{ yield} = \% \text{ conversion} \times \% \text{ selectivity}$$

EXAMPLE 1

Into a 100 ml 3-neck round bottom flask equipped with a magnetic stirrer, reflux condenser, dropping funnel, and thermometer, is charged 0.025 g (0.1 mmole) OsO₄, 10.1 g t-butyl alcohol, 3.0 g 1-octene, and 0.037 g (0.2 mmole) n-butyl iodide (co-catalyst I) under continuous agitation and atmospheric pressure.

An aqueous solution (2.9 g) containing 70% t-butyl hydroperoxide is then added at atmospheric pressure slowly over a period of 30 minutes at 26° C. to the mixture thereby introducing a total of 22 mmoles of hydroperoxide. The total amount of water in the resulting mixture is 5.9 g. The contents of the flask are warmed to 45° C. as a result of the reaction exotherm during the addition of the hydroperoxide solution. The pH of the resulting solution is about 5.

The contents of the reaction flask is then analyzed by gas chromatography upon completion of hydroperoxide addition.

The conversion of hydroperoxide is found to be 100%. 1.3 g of 1,2-octanediol is obtained indicating a selectivity to glycol of 42% and a yield of 42%.

EXAMPLE 2

Into a 100 ml 3-neck round bottom flask provided with a magnetic stirrer, reflux condenser, dropping funnel, and thermometer is charged 0.025 g O₄ (0.1 mmole), 10.0 g t-butyl alcohol, 3.0 g 1-octene, and 0.03 g (0.2 mmole) t-butyl bromide (co-catalyst I) under constant agitation at atmospheric pressure. To this mixture is added slowly, over a period of 45 minutes, 1.9 g of a 70% solution of t-butyl hydroperoxide in water (at 26° C.) thereby introducing 1.3 g of hydroperoxide into the flask. The contents of the flask are warmed to 36° C. as a result of the reaction exotherm during the addition of the hydroperoxide solution. The total amount of water present in the flask is 5.5 g. The pH of the reaction solution is about 5. The contents of the reaction flask are then analyzed by gas chromatography upon completion of the hydroperoxide addition.

The selectivity to the 1,2-octanediol is found to be 44%, the conversion of hydroperoxide is 100%, and the yield is 44%.

EXAMPLE 3

Example 2 is repeated with the exception that a mixture of co-catalyst I (CH₃I, 0.03 g, 0.2 mmol) and co-catalyst II (NaI, 0.03 g, 0.2 mmol) is used. The selectivity to 1,2-octanediol is 93.1%, conversion of the hydroperoxide is 100%, and yield is 93%.

EXAMPLE 4

Example 2 is repeated with the exception that OsCl₃ (0.030 g, 0.1 mmole) is used as osmium source with CH₃I (0.15 g, 1.0 mmol) as co-catalyst I. The selectivity to 1,2-octanediol is 38%, conversion of hydroperoxide is 100%, and the yield is 38%.

COMPARATIVE EXAMPLE 1

Example 2 is repeated with the exception that the co-catalyst I is omitted. The selectivity to 1,2-octane diol is 22%, conversion of hydroperoxide is 95%. and yield is 20.4%. Thus, in the absence of co-catalyst I the selectivity is reduced by 50% and the conversion is slightly reduced relative to Example 2.

The principles, preferred embodiments, and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art without departing from the spirit of the invention.

What is claimed is:

1. A process for hydroxylating olefins which comprises contacting in a liquid phase reaction mixture and in the presence of a catalyst composition: at least one olefin having at least one ethylenic unsaturation, at least one organohydroperoxide oxidant, water, and at least one inert organic solvent selected from the group consisting of aliphatic alcohol, aromatic alcohol, aliphatic ketone, aromatic ketone, aliphatic ether, alicyclic ether, glycol, n,n-dialkylamide, nitrile, aliphatic sulfoxide, aromatic sulfoxide, aliphatic sulfone, aromatic sulfone, and mixtures thereof, said catalyst composition comprising:

(a) as a catalyst at least one unsupported osmium containing compound capable of catalyzing the hydroxylation of said olefin in an amount of from about $1 \times 10^{-1}$ to about $1 \times 10^{-8}$ moles of osmium in said osmium catalyst per mole of olefin ethylenic unsaturation to be hydroxylated; and (b) as a first co-catalyst at least one organic halogenated hydrocarbon compound represented by the structural formula:

$$R_1-X)_{n''}$$ 

wherein $R_1$ is an inertly substituted or unsubstituted hydrocarbyl group selected from the group constituting of alkyl of from about 1 to about 20 carbons, aryl of from about 6 to about 14 carbons, aralkyl and alkaryl wherein the alkyl and aryl portions thereof are as described above, and cycloalkyl of from about 4 to about 20 carbons; said $R_1$ substituent when present being selected from the group consisting of hydroxy, ether, and ester; X represents at least one halogen independently selected from the group consisting of F, Cl, Br, and I; and $n''$ is a number of from about 1 to about 10, in an amount effective to improve at least one of the rate and selectivity to hydroxylated olefin relative to the rate and selectivity in the absence of said first co-catalyst, said amount being sufficient to provide, in said reaction mixture, a ratio of moles of halide in said first co-catalyst to moles of osmium in said catalyst of from about 0.1 to about 500:1; said contacting being conducted in a manner and under conditions sufficient to hydroxylate at least one of said ethylenic unsaturation to its corresponding diol in the presence of such catalyst composition.

2. The process of claim 1 wherein said first co-catalyst is selected from the group consisting of iodomethane, bromomethane, 1-bromobutane, 1-iodobutane, 1-bromo-1,1-dimethylethane, 1-iodo-1,1-dimethylethane, 2-iodobutane, 2-bromobutane, 2-methyl-2-iodopropane, 2-methyl-2-bromopropane, 2-iodoethanol, 2-bromoethanol and mixtures thereof.

3. The process of claim 1 wherein said catalyst composition additionally comprises as a second co-catalyst at least one member selected from the group consisting of alkali metal halide, alkaline earth metal halide, hydrogen halide, tetra hydrocarbyl phosphonium halide, halogen, and transition metal halide said transition metal being selected from the group consisting of Fe, Co, Ni, Cu, V, Cr, Mn, Sc, Ti, Mo, Ru, Rh, Pd and W.

4. The process of claim 1 wherein the inert solvent is selected from the group consisting of ethylene glycol, propylene glycol, and mixtures thereof.

5. The process of any one of claims 1 and 3 wherein the organohydroperoxide is selected from the group consisting of t-butyl hydroperoxide, ethyl benzyl hydroperoxide, t-amyl hydroperoxide, and 2-butyl hydroperoxide.

6. The process of any one of claims 1 and 3 wherein water is present in said liquid phase in at least a stoichiometric molar ratio with the molar amount of said ethylenic unsaturation to be hydroxylated.

7. The process of claim 9 wherein the olefin is selected from the group consisting of ethylene, propylene and mixtures thereof, the organohydroperoxide is t-butyl hydroperoxide, and the inert solvent is t-butyl alcohol.

8. The process of claim 1 wherein the first co-catalyst is present in said liquid phase in an amount sufficient to achieve a molar ratio between the moles of halide in the first co-catalyst and the moles of osmium in the osmium containing compound of from about 1:1 to about 50:1.

9. The process of any one of claims 1 and 3 wherein said osmium containing compound is osmium tetroxide.

10. The process of claim 3 comprising the additional steps of: (a) forming the first co-catalyst during the hydroxylation reaction by reaction of the halogen from the second co-catalyst with the hydroxylated olefin product; (b) separating the hydroxylated product from at least the first co-catalyst; and (c) circulating at least the first co-catalyst for use in the liquid phase reaction mixture.

11. The process of claim 1 wherein the halogen of the halogenated hydrocarbon is selected from the group consisting of bromine, iodine, and mixtures thereof.

* * * * *